United States Patent [19]

Swadley

[11] Patent Number: 4,639,188

[45] Date of Patent: Jan. 27, 1987

[54] TURBINE WHEEL CONTAINMENT

[75] Inventor: Gerald L. Swadley, Rockford, Ill.

[73] Assignee: Sundstrand Corporation, Rockford, Ill.

[21] Appl. No.: 677,874

[22] Filed: Dec. 4, 1984

[51] Int. Cl.⁴ .................. F01D 21/00; F01D 25/24
[52] U.S. Cl. ................................. 415/9; 415/196; 416/2
[58] Field of Search .............. 415/9, 196, 197; 416/2

[56] References Cited

U.S. PATENT DOCUMENTS

| 2,879,936 | 3/1959 | Faught | 415/9 X |
| 3,241,813 | 3/1966 | Von Flue et al. | 415/9 |
| 3,989,407 | 11/1976 | Cunningham | 416/2 X |
| 4,149,824 | 4/1976 | Adamson | 415/9 |
| 4,397,608 | 8/1983 | Husain et al. | 415/9 |
| 4,411,589 | 10/1983 | Joubert et al. | 415/9 |
| 4,417,848 | 11/1983 | Dembeck | 415/121 G |

Primary Examiner—Everette A. Powell, Jr.
Attorney, Agent, or Firm—Wood, Dalton, Phillips, Mason & Rowe

[57] ABSTRACT

Axial dislocation of a containment ring for a turbine is avoided through the use of housings having portions overlapping and extending across a radially inwardly opening containment groove in a containment ring. Upon separation of a blade from a turbine wheel, the sleeves are deformed into the groove thereby locking the ring in the desired axial location.

9 Claims, 2 Drawing Figures

TURBINE WHEEL CONTAINMENT

FIELD OF THE INVENTION

This invention relates to the provision of a containment structure for the blades of a turbine wheel in the event they become disassociated from the hub during rotation of the wheel. More specifically, the invention relates to the provision of radial containment structure that provides a measure of axial containment as well.

BACKGROUND OF THE INVENTION

Prior art of possible relevance includes U.S. Pat. No. 3,989,407 issued Nov. 2, 1976 to Cunningham and, conceivably, U.S. Pat. No. 4,417,848 issued Nov. 29, 1983 to Dembeck.

As is well known, turbine wheels utilized in turbines of various sorts frequently operate at extremely high rotational speeds. Any of a variety of occurrences can cause the breakage of turbine blades forming part of the turbine wheels. For example, ingestion of foreign material into the turbine can cause such breakage. Similarly, fatigue of the turbine blades, frequently introduced by thermal forces may, cause breakage of one or more turbine blades. In a like vein, excessive wear on bearings journalling the turbine wheel may lead to interference between fixed and rotating components of the turbine which in turn can cause breakage of blades.

Because of the high rotational velocities at which such wheels frequently turn, the blades contain considerable stored energy which is released upon breakage of one or more of the blades. The centrifugal force will cause the blade fragment to travel radially outwardly at high velocity which is sufficient to pierce the relatively thin housing for the turbine and exit the same while still at very high velocity. Not infrequently, in the course of movement, the separated fragment of a blade will be deflected by other turbine components such that its path of travel will have an axially directed component as well as a radially directed one. In any event, such fragments, whether traveling purely radially, or purely axially, or both radially and axially, have the capacity to severely damage other objects in the vicinity of the turbine.

To avoid this problem, various so-called "containment" proposals have evolved. The object of such proposals is to prevent the escape of separated turbine blade fragments at high velocity from the turbine in the radial, or axial, or both directions.

Radial confinement is frequently effected by a so-called containment ring. Typically, a containment ring is a relatively thick ring of material capable of withstanding high impact loads. The same is disposed about the turbine blades just radially outwardly of the peripheries thereof and in axial alignment therewith. A radially inwardly opening groove is located on the inner periphery of the ring in facing relation to the ends of the turbine blades. Radially traveling separated blade fragments move radially outwardly to impact against the ring at the bottom of the groove and the walls of the groove prevent substantial axial deflection of the separated fragments.

Heretofore, many proposals for containment rings utilize bolts for securing the ring in axial alignment with the blades. In many instances, particularly where weight is of concern as in aircraft applications, to save weight, the components are made as small and as compact as possible. Thus, in systems such as shown in the previously identified Cunningham patent, locating bolts may be in fairly close proximity axially speaking to the blades such that a blade fragment traveling principally in the radial direction but having an axial component of movement can impact against the bolts to shear the same. Additionally, the ring location housings may deform and separate. In either event, the containment ring can no longer be positively located in axial alignment with the blades. If the ring then becomes misaligned, it can no longer provide radial containment. Moreover, such constructions as are known in the prior art universally require provision of separate means to provide axial containment.

The present invention is directed to overcoming one or more of the above problems.

SUMMARY OF THE INVENTION

It is the principal object of the invention to provide a new and improved turbine assembly that provides for radial containment of separated turbine blades. It is also an object of the invention to provide such a containment structure that additionally provides a measure of axial containment as well.

An exemplary embodiment of the invention achieves the foregoing objects in a turbine assembly including a turbine wheel journalled for rotation about an axis and having a plurality of turbine blades which generally radially extend away from the axis in at least one stage. A containment ring having a central opening surrounds the blades and is spaced radially outwardly thereof in axial alignment therewith. The radially inner surface of the ring includes a radially inwardly opening groove facing the blades. First and second, generally axially extending, deformable housings are provided for the turbine wheel. The housings are located radially outwardly of the blades and radially inwardly of the ring and sandwich the ring to maintain the ring in axial alignment with the blades. The housings have portions overlapping each other and enclosing the groove without substantially entering the same.

As a consequence of this construction, when turbine blades separate from the hub of the turbine wheel and move radially outwardly, they impact upon the overlapping portions of the housings to deform the same into the groove thereby also forming a groove in the overlapping portions which act to confine the turbine blade fragments in the same manner as in the prior art. Additionally, the driving of the overlapping portions into the groove prevents the ring from shifting axially because it is restrained in the axial direction by the portion of the housings now disposed within the groove in the ring.

Furthermore, because the portions of the housings driven into the groove move radially outwardly, portions of such housings axially remote from the groove tend to move radially inwardly thereby providing an enhanced measure of axial containment.

In a preferred embodiment, each of the housings oppositely of the turbine structure has a radially outwardly directed shoulder. The shoulders respectively abut an adjacent side of the ring to normally restrain axial movement thereof.

A highly preferred embodiment further contemplates that the first housing, at a location axially in advance of the turbine wheel, and the second housing, at a location axially behind the turbine wheel, each mount radially inwardly directed struts or blades which extend inwardly of the overlapping portions toward the turbine rotational axis to at least partially flank the blades on both sides thereof. Thus, when the overlapping portions are driven outwardly by broken fragments of a turbine blade, the radially inwardly directed struts or blades are moved radially inwardly to provide the aforementioned measure of axial containment.

In a highly preferred embodiment, the structure is further characterized by the absence of axially extending bolts interconnecting the shoulders on the housings.

Other objects and advantages will become apparent from the following specification taken in connection with the accompanying drawings.

DESCRIPTION OF THE PREFERRED EMBODIMENT

Figure 1:
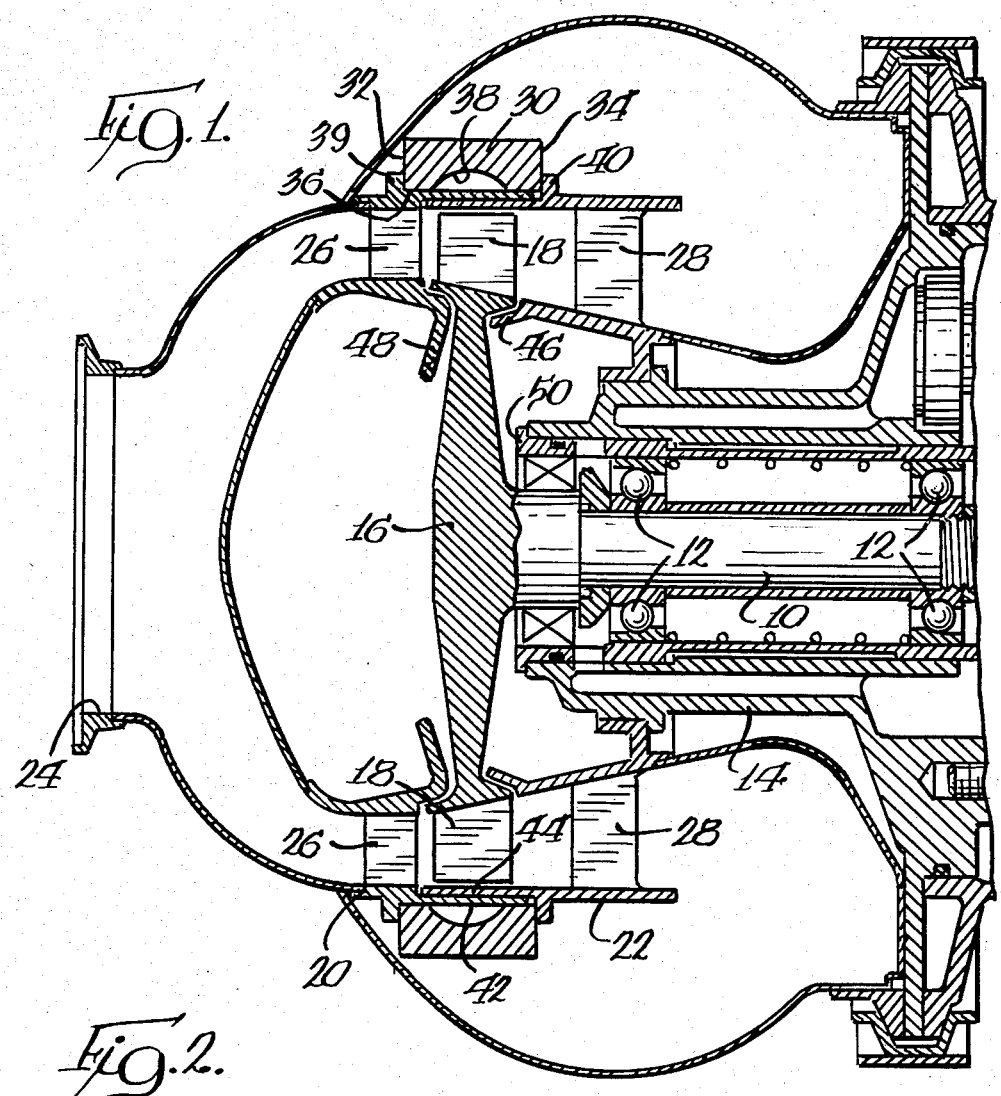
FIG. 1 is a fragmentary, sectional view of a turbine embodying containment means made according to the invention.

An exemplary embodiment of a turbine including a containment means made according to the invention is illustrated in FIG. 1 in the form of a single stage turbine which may be used, for example, in starting a jet engine. However, it is to be understood that the invention can be employed with efficacy in turbines used for other purposes as well as turbines having a greater number of stages.

Referring now to FIG. 1, the turbine includes a shaft 10 journalled as by bearings 12 in any suitable form of fixed structure 14. One end of the shaft 10 terminates in a hub 16 which in turn mounts a plurality of generally radially extending turbine blades 18.

To one side of the blades 18 is an inlet housing 20 and to the opposite side of the blades 18 is an exhaust housing 22. The inlet housing 20 includes a suitable inlet port 24 for receiving gas under pressure. The incoming gas is directed axially toward the blades 18 as by a conventional nozzle structure or blades 26 mounted on the housing 20 to extend radially inwardly thereof in close axial proximity to the blades 18.

On the downstream side of the blades 18, the housing 22 may mount radially inwardly directed struts or diffuser blades 28 which may likewise be of conventional construction.

A containment ring 30 is located in axial alignment with the blades 18 and radially outwardly thereof. The containment ring 30 may be made of materials conventionally employed for the purpose and includes opposed sides 32 and 34 as well as an inner side 36. The inner side 36 is provided with a radially inwardly opening, annular groove 38 of arcuate cross section. In normal operation of the turbine, the ring 30 is maintained in the located illustrated in FIG. 1 by peripheral shoulders 39 and 40 on the outer sides of the housings 20 and 22, respectively. The shoulders 39 and 40 respectively abut the sides 32 and 34 of the containment ring 30. Unlike prior art constructions, no bolts interconnecting the shoulders 39 and 40 are required.

The housings 20 and 22 are formed of conventional metal materials used for the purpose and as a consequence are deformable. This characteristic is employed as will become apparent.

The housing 20 includes an axially extending, continous, annular sleeve 42 which overlaps and extends completely across the groove 38 in the containment ring 30. As can be seen from the drawing, the sleeve 42 is in abutment with the inner side 36 of the containment ring 30.

The housing 22 includes an oppositely directed axial by extending, continuous, annular sleeve 44 which likewise overlaps and extends completely across the groove 38. The sleeve 44 extends into the sleeve 42 and both are located radially outwardly of the blades 18 and, of course, radially inwardly of the ring 30. Consequently the housings 20 and 22 provide continous circumferential attachment with the ring 30.

Conventionally, and forming no part of the invention, the structure may include, at locations radially inwardly of the blades 18, axial containment structure as, for example, at the locations designated 46, 48 and 50.

Figure 2:
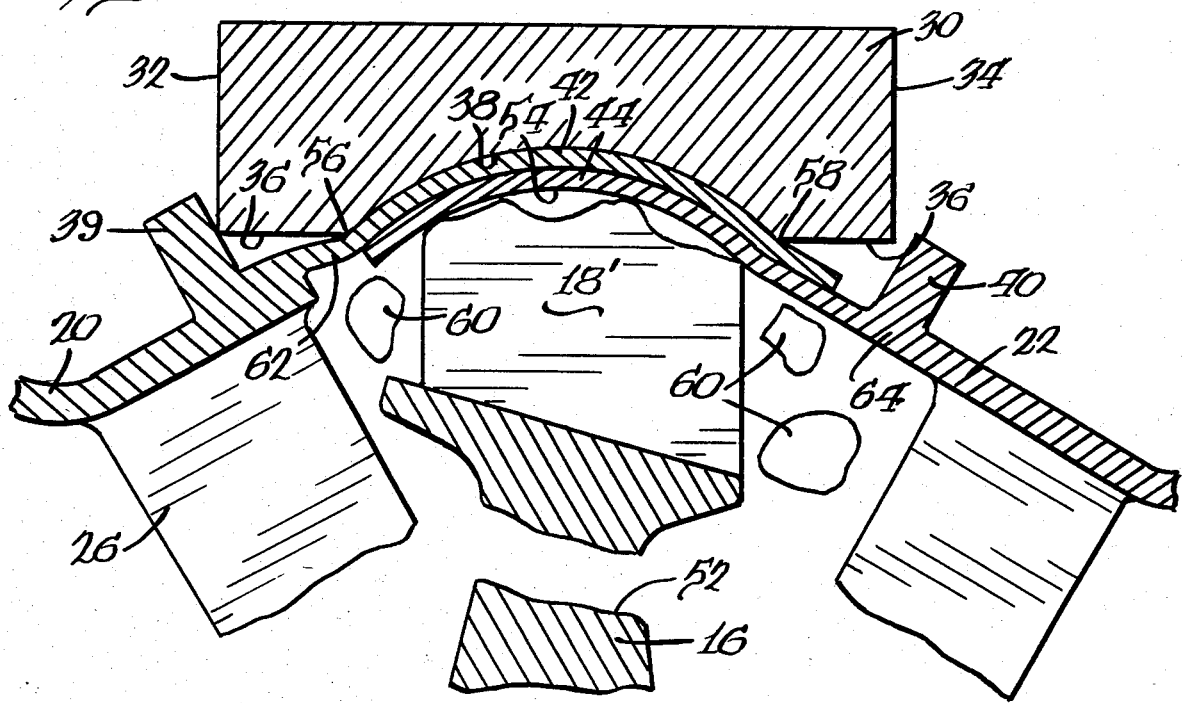
FIG. 2 is an enlarged, fragmentary sectional view illustrating the operation of the containment means of the present invention upon the breakage of a turbine blade.

For normal operation of the turbine, the components will asume the condition illustrated in FIG. 1. However, upon breakage of one or more turbine blades, the components will assume the configuration illustrated in FIG. 2. In FIG. 2, a break of one of the blades is shown at 52, which is at a location corresponding to a typical design break point in a blade. As a consequence, the blade 28 has moved radially outwardly under the influence of centrifugal force to impact against the sleeve 44 on the housing 22. The force is sufficient to drive the sleeve 44 as well as the sleeve 42, which abuts the sleeve 44, into the groove 38 in the containment ring 30. Consequently, a groove is formed in the sleeve 44 which now acts as the containment groove and performs the functions conventionally expected of the same. In short, the newly formed groove 54 provides for radial containment of the fragment of the blade 18 shown at 18' in FIG. 2.

The newly formed groove 54 provides an additional function. Because the groove 54 will be formed generally around the entirety of the inner surface 36 of the ring 30, it will be appreciated that the ring 30 is now axially restrained by the deformed portion of the sleeves 44 and 42 within the groove 38, thereby eliminating the possibility of axial movement of the ring 30 found in prior art constructions wherein bolts which may be sheared are employed.

At the same time, the sides 56 and 58 of the groove 38 act as fulcrum points. The radially outward movement of the sleeves 42 and 44 caused by the force imparted thereto by the blade fragments 18 causes radially inward movement of the axially outer portions of the housings 20 and 22 by pivotal movement on the edges 56 and 58 in a direction axially toward the blades 18. This in turn may cause some movement of the blades 26 and 28 inwardly as shown in FIG. 2 so that they may serve as labyrinths to provide a measure of axial containment for fragments 60 of the blades 18. Furthermore, portions 62 and 64 of the housings 20 and 22 have moved radially inwardly away from the surface 36 of the containment ring 30 to also provide such containment.

It will therefore be appreciated that a turbine made according to the invention provides enhanced radial containment of turbine blade fragments. The ability to locate the containment ring 30 without the need of bolts, in normal operation by the shoulders 39 and 40, and after fragmentation of the blades 18' by the deformation of the sleeves 42 and 44 into the groove 38, assures that the axial position of the containment ring 30 cannot shift during fragmentation of a blade to prevent it from performing its containment function. At the same time, the deformation of the sleeves 42 and 44 occurring upon fragmentation drives parts of the housings 20 and 22 radially inwardly at locations on both sides of the blades to provide a measure of axial containment as well which cannot be achieved with prior art structures.

I claim:

1. A turbine assembly, comprising:
 a turbine wheel journalled for rotation about an axis, and having a plurality of turbine blades generally radially extending away from said axis in at least one stage;
 a containment ring having a central opening surrounding said blades and spaced radially outwardly thereof, the radially inner surface of said ring including a radially inwardly opening groove; and
 first and second, generally axially extending, deformable housings for said turbine wheel, said housings being radially outwardly of said blades and radially inwardly of said ring and sandwiching said ring to maintain said ring in axial alignment with said blades, said housings having portions overlapping and closing said groove without substantially entering the same and mounting turbine structure extending radially inwardly toward said axis to at least partially flank said blades in axially spaced relation thereto.

2. The turbine assembly of claim 1 wherein said first housing is axially in advance of said turbine wheel and said second housing is axially behind said turbine wheel, said turbine structure mounted on said first housing comprising nozzles and said turbine structure mounted on said second housing comprising diffusers.

3. A turbine assembly, comprising:
 a turbine wheel journalled for rotation about an axis and having a plurality of turbine blades generally radially extending away from said axis in at least one stage;
 a containment ring having a central opening surrounding said blades and spaced radially outwardly thereof, the radially inner surface of said ring including an annular radially inwardly opening groove of arcuate cross section; and
 first and second, generally axially extending, deformable housings for said turbine wheel, said housings being radially outwardly of said blades and radially inwardly of said ring and sandwiching said ring to maintain said ring in axial alignment with said blades, each of said housings having an annular sleeve overlapping and closing said groove without substantially entering the same, said housings further mounting turbine structure extending radially inwardly toward said axis to at least partially flank said blades in axially spaced relation thereto.

4. The turbine assembly of claim 3 wherein said sleeves extend towards and overlap each other and each fully extends across said groove with one of said sleeves being received within the other.

5. The turbine assembly of claim 4 wherein each of said housings, oppositely of said turbine structure has a radially outwardly directed shoulder, said shoulders respectively abutting an adjacent side of said ring to restrain axial movement thereof.

6. A turbine assembly, comprising:
 a turbine wheel journalled for rotation about an axis and having a plurality of turbine blades generally radially extending away from said axis in at least one stage;
 a containment ring having a central opening surrounding said blades and spaced radially outwardly thereof in axial alignment therewith, the radially inner surface of said ring including a radially inwardly opening groove; and
 first and second, generally axially extending, deformable housings for said turbine wheel, said housings being radially outwardly of said blades and radially inwardly of said ring and sandwiching said ring to maintain said ring in axial alignment with said blades, said housings having portions overlapping each other closing said groove without substantially entering the same.

7. The turbine assembly of claim 6 wherein each of said housings, oppositely of said turbine structure has a radially outwardly directed shoulder, said shoulders respectively abutting an adjacent side of said ring to restrain axial movement thereof.

8. The turbine assembly of claim 7 wherein said first housing, at a location axially in advance of said turbine wheel, and said second housing, at a location axially behind said turbine wheel, each mount radially inwardly directed struts or blade means extending inwardly of said portion toward said axis to at least partially flank said blades on both sides thereof.

9. The turbine assembly of claim 7 and further characterized by the absence of axially extending bolts interconnecting said shoulders.

* * * * *